(12) United States Patent
Kozuka et al.

(10) Patent No.: US 12,306,933 B2
(45) Date of Patent: May 20, 2025

(54) ARITHMETIC PROCESSING APPARATUS, ARITHMETIC PROCESSING SYSTEM, ARITHMETIC PROCESSING METHOD, AND ARITHMETIC PROCESSING PROGRAM

(71) Applicant: SEERA NETWORKS, INC., Tokyo (JP)

(72) Inventors: Masahiro Kozuka, Tokyo (JP); Tomoya Kawanishi, Tokyo (JP); Kenji Ohira, Tokyo (JP)

(73) Assignee: SEERA NETWORKS, INC., Tokyo (JP)

( * ) Notice: Subject to any disclaimer, the term of this patent is extended or adjusted under 35 U.S.C. 154(b) by 0 days.

(21) Appl. No.: 18/598,706

(22) Filed: Mar. 7, 2024

(65) Prior Publication Data
US 2024/0303320 A1    Sep. 12, 2024

Related U.S. Application Data

(63) Continuation of application No. PCT/JP2023/024185, filed on Jun. 29, 2023.

(30) Foreign Application Priority Data

Jun. 29, 2022   (JP) ................... 2022-104907

(51) Int. Cl.
G06F 21/00 (2013.01)
G06F 21/53 (2013.01)
G06F 21/57 (2013.01)

(52) U.S. Cl.
CPC ............ G06F 21/53 (2013.01); G06F 21/575 (2013.01)

(58) Field of Classification Search
CPC ........ G06F 21/53; G06F 21/575; G06F 9/455; G06F 21/57
See application file for complete search history.

(56) References Cited

U.S. PATENT DOCUMENTS 9,584,517 B1 * 2/2017 Roth ..................... G06F 21/602
9,584,527 B2 2/2017 Roth et al.
(Continued)

FOREIGN PATENT DOCUMENTS

JP 2010055318 A 3/2010
JP 2021124992 A 8/2021
(Continued)

OTHER PUBLICATIONS

Japanese Patent Decision to Grant (with English translation) received in corresponding Application No. JP 2023-546151, dated Nov. 14, 2023, 5 pages.
(Continued)

Primary Examiner — Ghazal B Shehni
(74) Attorney, Agent, or Firm — Dority & Manning, P.A.

(57) ABSTRACT

To provide a secure arithmetic processing environment even in a system with an unreliable hypervisor, an arithmetic processing apparatus is capable of acquiring a secure program from outside. The the arithmetic processing apparatus includes at least: hardware including at least a CPU, an input/output apparatus, and a storage apparatus; a hypervisor managing the hardware; and one or more virtual arithmetic processing apparatuses provided with a virtual arithmetic processing environment by the hypervisor, wherein each of the virtual arithmetic processing apparatuses includes at least a guest OS and a memory, a bootloader is transferred to the memory for each of virtual arithmetic processing apparatuses from the outside in such a manner that the bootloader can only be used by the hardware from the virtual arithmetic processing apparatus, the bootloader acquires the secure program, and the bootloader starts the secure program in the virtual arithmetic processing apparatus.

10 Claims, 5 Drawing Sheets

(56) References Cited

U.S. PATENT DOCUMENTS

| | | | |
|---|---|---|---|
| 2010/0266121 A1* | 10/2010 | Yamazaki | G06F 21/6209 |
| | | | 718/1 |
| 2011/0055299 A1* | 3/2011 | Phillips | G06F 9/45533 |
| | | | 707/827 |
| 2011/0154325 A1 | 6/2011 | Terasaki | |
| 2014/0317394 A1* | 10/2014 | Buhler | G06F 9/4416 |
| | | | 713/2 |
| 2017/0032119 A1 | 2/2017 | Dore et al. | |
| 2019/0034218 A1* | 1/2019 | El-Moussa | H04L 63/06 |
| 2020/0285492 A1 | 9/2020 | Mihajlovski et al. | |

FOREIGN PATENT DOCUMENTS

| | | |
|---|---|---|
| JP | 2022522643 A | 4/2022 |
| WO | WO 2009081530 A1 | 7/2009 |

OTHER PUBLICATIONS

Japanese Office Action (with English translation) for corresponding Application No. JP 2023-546151, drafting date Sep. 11, 2023, 10 pages.

English translation of International Search Report received in corresponding Application No. PCT/JP2023/024185, dated Sep. 19, 2023, 3 pages.

English translation of Notice of Reasons for Refusal received in corresponding Application No. JP 2023-546151, dated Sep. 11, 2023, 5 pages.

\* cited by examiner

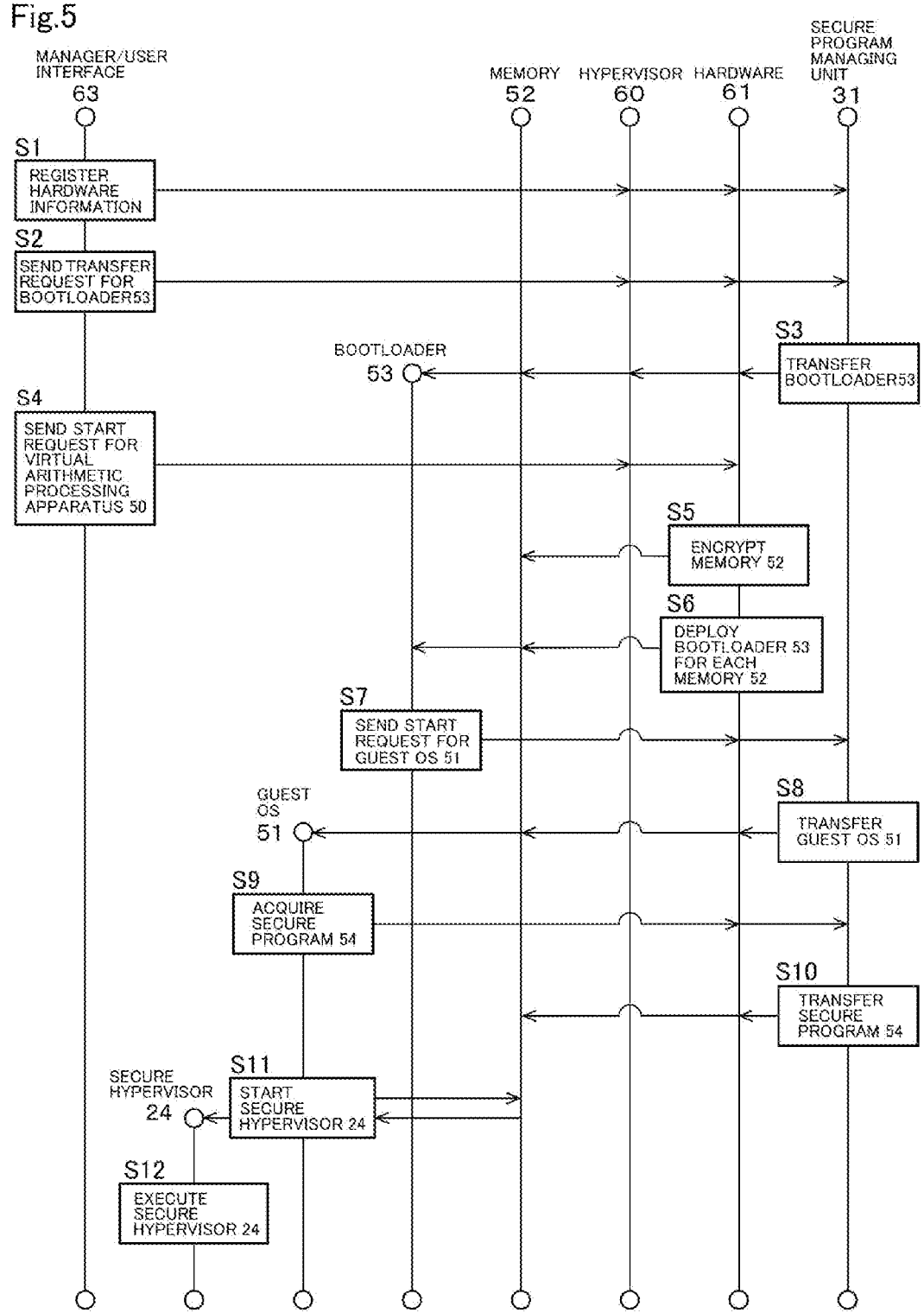

ARITHMETIC PROCESSING APPARATUS, ARITHMETIC PROCESSING SYSTEM, ARITHMETIC PROCESSING METHOD, AND ARITHMETIC PROCESSING PROGRAM

CROSS-REFERENCE TO RELATED APPLICATIONS

This application is a continuation of International Application No. PCT/JP2023/024185, filed on Jun. 29, 2023, which, in turn, claims priority to Japanese Patent Application No. 2022-104907, filed on Jun. 29, 2022, both of which are hereby incorporated herein by reference in their entireties for all purposes.

BACKGROUND OF THE INVENTION

1. Field of the Invention

The present invention relates to an arithmetic processing apparatus, an arithmetic processing system, an arithmetic processing method, and an arithmetic processing program.

2. Description of the Related Art

Conventionally, computer systems that cause a plurality of virtual computers to run using a hypervisor are known. Japanese Patent Application Laid-open No. 2010-055318 discloses a computer system capable of scanning all code groups stored in a storage space assigned to a virtual computer that is used from a client. In the computer system described in Japanese Patent Application Laid-open No. 2010-055318, a special virtual computer that is concealed from the client is prepared outside of a general virtual computer that is used by the client and the special virtual computer scans a code group read from a storage space assigned to the general virtual computer.

In addition, WO 2009/081530 discloses a virtual computer system capable of forcing a guest OS or an application running on the guest OS to comply with a security policy without installing a special agent on the guest OS. In the virtual computer system described in WO 2009/081530, a hypervisor includes: setting item information holding means which holds setting item information in which a security policy to be applied to the virtual computer system is constituted of a set value of a setting item in accordance with a type of a guest OS or a type of an application; setting detecting means which monitors an instruction executed by the guest OS and an output of a physical device and which detects a set value that is set to a setting item or a set value to be changed of the setting item information holding means; and setting applying means which, when a set value detected by the setting detecting means and a set value indicated by the setting item information differ from each other, applies the set value indicated by the setting item information to the guest OS or the application, which is a setting object of the setting item.

SUMMARY OF THE INVENTION

In the virtual computer system described in Japanese Patent Application Laid-open No. 2010-055318, a scanner is constituted of an assist which reads a code group from the storage space of the general virtual computer and an engine which scans the read code group, the engine is executed by the special virtual computer, and the assist is executed by a hypervisor. Therefore, since the code group in the storage space of the general virtual computer is managed by the hypervisor, a secure environment is maintained, when premised on the hypervisor being a reliable system, for a user of the general virtual computer. However, since there is no guarantee that hypervisors in all virtual computer systems are reliable on a general network, it is difficult to maintain a secure environment.

In the virtual computer system described in WO 2009/081530, while the hypervisor includes the setting applying means which, when a set value detected by the setting detecting means and a set value indicated by the setting item information differ from each other, applies the set value indicated by the setting item information to the guest OS or the application, which is a setting object of the setting item, and the guest OS or the application running on the guest OS can be forced to comply with a security policy, this is premised on the hypervisor being a reliable system. However, as described above, since there is no guarantee that hypervisors in all virtual computer systems are reliable on a general network, it is difficult for a user of the guest OS to maintain a secure environment.

In consideration thereof, an object of the present invention is to provide an arithmetic processing apparatus, an arithmetic processing system, an arithmetic processing method, or an environment which enables an arithmetic processing program to be arithmetically processed in a secure manner even in a system having an unreliable hypervisor.

The above object of the present invention can be achieved by the following configurations. Specifically, an arithmetic processing apparatus according to a first aspect of the present invention is an arithmetic processing apparatus capable of acquiring a secure program from outside, the arithmetic processing apparatus comprising at least: hardware including at least a CPU, an input/output apparatus, and a storage apparatus; a hypervisor managing the hardware; and one or more virtual arithmetic processing apparatuses provided with a virtual arithmetic processing environment by the hypervisor, wherein each of the virtual arithmetic processing apparatuses includes at least a guest OS and a memory, a bootloader is transferred to the memory for each of the virtual arithmetic processing apparatuses from the outside in such a manner that the bootloader can only be used by the hardware from the virtual arithmetic processing apparatus, the bootloader starts the secure program in the virtual arithmetic processing apparatus, the bootloader acquires at least any one of the guest OS, and the secure program, the guest OS is acquired and started by the bootloader, and the guest OS acquires the secure program.

An arithmetic processing apparatus according to a second aspect of the present invention is the arithmetic processing apparatus according to the first aspect, wherein the guest OS acquires a secure hypervisor as the secure program.

An arithmetic processing apparatus according to a third aspect of the present invention is the arithmetic processing apparatus according to the first aspect, wherein at least any one of the guest OS, and the secure program is transferred along with the transfer of the bootloader.

An arithmetic processing apparatus according to a fourth aspect of the present invention is the arithmetic processing apparatus according to the third aspect, wherein the secure hypervisor is transferred as the secure program.

An arithmetic processing apparatus according to a fifth aspect of the present invention is the arithmetic processing apparatus according to the second aspect, wherein the virtual arithmetic processing apparatuses are managed by the secure hypervisor, and the secure hypervisor manages the virtual arithmetic processing apparatuses so that arithmetic processing is performed within a range of usage conditions defined by additional information attached to provision information acquired from an external information providing apparatus.

An arithmetic processing apparatus according to a sixth aspect of the present invention is the arithmetic processing apparatus according to the fourth aspect, wherein the virtual arithmetic processing apparatuses are managed by the secure hypervisor, and the secure hypervisor manages the virtual arithmetic processing apparatuses so that arithmetic processing is performed within a range of usage conditions defined by additional information attached to provision information acquired from an external information providing apparatus.

An arithmetic processing apparatus according to an seventh aspect of the present invention is the arithmetic processing apparatus according to the first aspect, wherein the secure program is a program including at least one of a secure hypervisor, an OS, a game, a processing infrastructure of data science, an AI, and a program including an intellectual property-like value of which reverse engineering is desirably prevented.

An arithmetic processing system according to a eighth aspect of the present invention is an arithmetic processing system including at least the arithmetic processing apparatus according to the first aspect and a management server managing the arithmetic processing apparatus, wherein the management server includes at least a secure program managing unit manages the secure program to be provided to the virtual arithmetic processing apparatuses.

An arithmetic processing method according to a ninth aspect of the present invention is an arithmetic processing method carried out by an arithmetic processing apparatus capable of acquiring a secure program from outside, the arithmetic processing apparatus including at least: hardware including at least a CPU, an input/output apparatus, and a storage apparatus; a hypervisor managing the hardware; and one or more virtual arithmetic processing apparatuses provided with a virtual arithmetic processing environment by the hypervisor, and each of the virtual arithmetic processing apparatuses including at least a guest OS and a memory, the arithmetic processing method comprising the steps of: transferring a bootloader to the memory for each of the virtual arithmetic processing apparatuses from the outside in such a manner that the bootloader can only be used by the hardware from the virtual arithmetic processing apparatus; starting, with the bootloader, the secure program in the virtual arithmetic processing apparatus; acquiring, with the bootloader, at least any one of the guest OS, and the secure program; acquiring and starting, with the bootloader, the guest OS; and acquiring, with the guest OS, the secure program.

An arithmetic processing method according to a tenth aspect of the present invention is the arithmetic processing method according to the ninth aspect, wherein the secure program is a program including at least one of a secure hypervisor, an OS, a game, a processing infrastructure of data science, an AI, and a program including an intellectual property-like value of which reverse engineering is desirably prevented.

An arithmetic processing program according to a eleventh aspect of the present invention executes each step of the arithmetic processing method according to the eighth aspect by a computer.

An arithmetic processing program according to a twelfth aspect of the present invention executes each step of the arithmetic processing method according to the ninth aspect by a computer.

According to an embodiment of the present invention, a secure arithmetic processing environment can be provided even in a system with an unreliable hypervisor.

BRIEF DESCRIPTION OF THE DRAWINGS

FIG. 5 is a flow chart of downloading a secure program.

DESCRIPTION OF THE PREFERRED EMBODIMENTS

Hereinafter, an arithmetic processing apparatus, an arithmetic processing system, an arithmetic processing method, and an arithmetic processing program according to embodiments of the present invention will be described with reference to the drawings. However, the embodiments described below are simply intended to exemplify an arithmetic processing apparatus, an arithmetic processing system, an arithmetic processing method, and an arithmetic processing program for embodying the technical ideas of the present invention and are not intended to limit the present invention to the embodiments. The present invention can be equally applied to other embodiments included in the claims.

First Embodiment

An arithmetic processing apparatus, an arithmetic processing system, an arithmetic processing method, and an arithmetic processing program according to a first embodiment of the present invention will be described with reference to FIGS. 1 to 5. First, a virtual arithmetic processing apparatus 50 that performs arithmetic processing under a secure hypervisor 24 will be described as an example of the arithmetic processing system with reference to FIGS. 1 to 3. While the secure hypervisor 24 will be described as an example of a secure program 54 in the present embodiment, the present invention is not limited there to and examples of the secure program 54 include various programs such as an OS itself and a game as will be described in a second embodiment.

Figure 1:
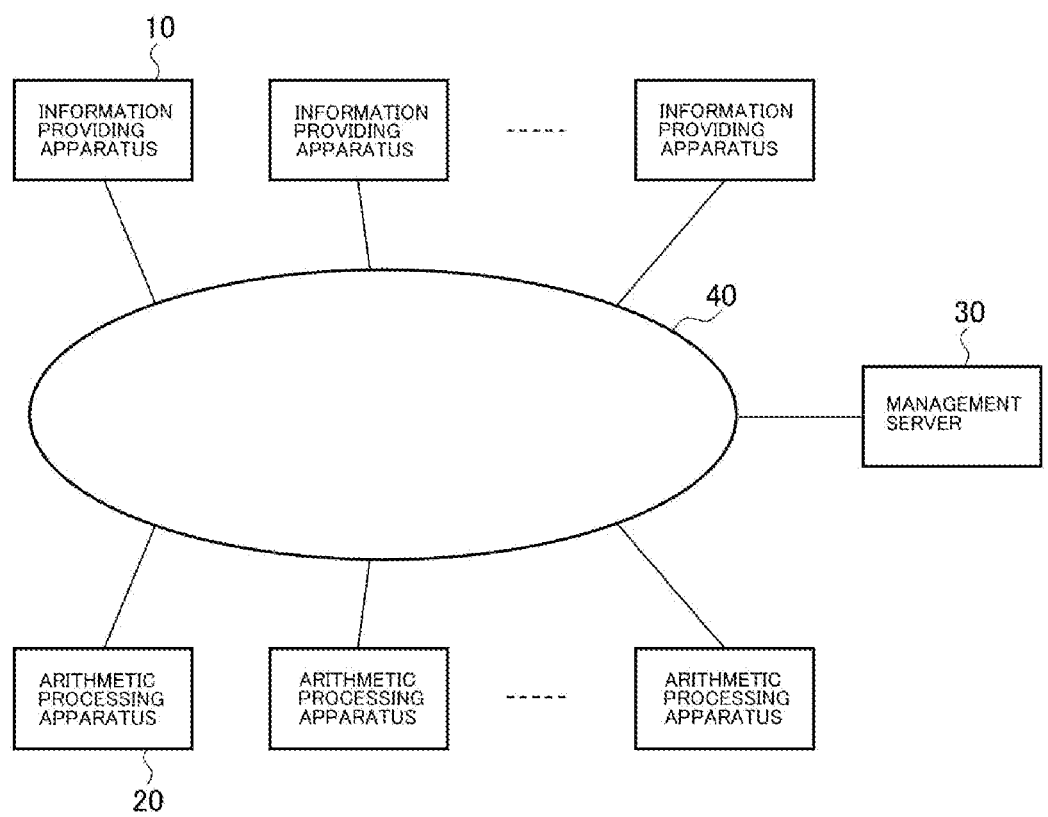
FIG. 1 is an overall block diagram of an arithmetic processing system.

FIG. 1 is an overall block diagram of an arithmetic processing system. The arithmetic processing system includes an information providing apparatus 10, an arithmetic processing apparatus 20, and a management server 30. The information providing apparatus 10, the arithmetic processing apparatus 20, and the management server 30 are connected to one another by an information network 40. One or more of the information providing apparatus 10 and one or more of the arithmetic processing apparatus 20 are provided.

Figure 2:
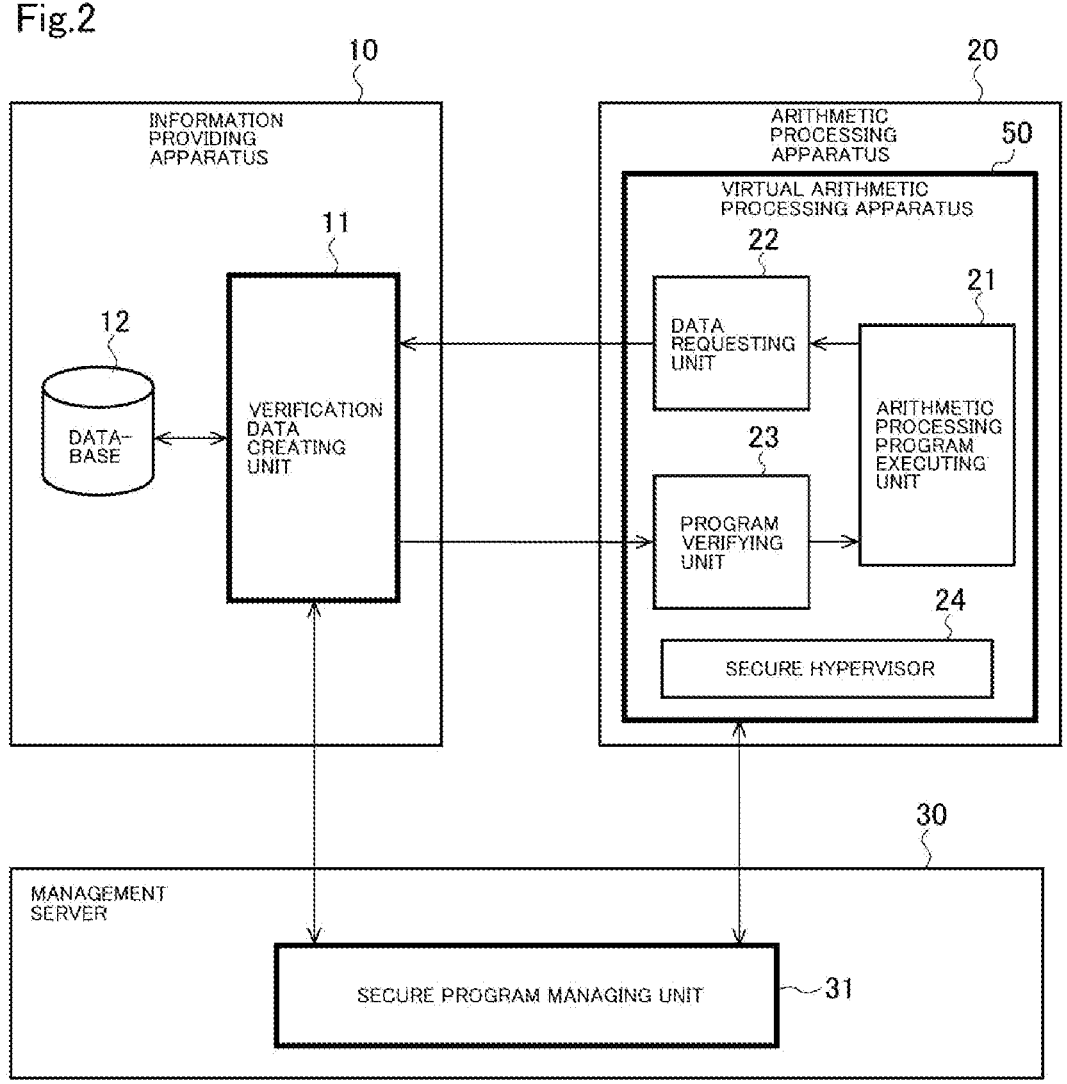
FIG. 2 is an explanatory operation diagram of the arithmetic processing system.

FIG. 2 is an explanatory operation diagram of the arithmetic processing system. The information providing apparatus 10 includes a verification data creating unit 11 and a database 12. The verification data creating unit 11 and the database 12 are connected to each other and the arithmetic processing apparatus 20 can be provided with information in the database 12 via the verification data creating unit 11.

In response to data request information from a data requesting unit 22 of the arithmetic processing apparatus 20, the verification data creating unit 11 outputs data for verification and arithmetic result data for verification used for verification of arithmetic processing as will be described later by an arithmetic operation performed by a CPU (not illustrated) based on an information providing apparatus program provided by a secure program managing unit 31 of the management server 30. In addition, for example, based on data usage restriction information set in advance by input/output means (not illustrated) or the like or stored in the database 12, the verification data creating unit 11 creates data of an authorization list with respect to the arithmetic processing apparatus 20 by an arithmetic operation performed by the CPU according to the information providing apparatus program. Furthermore, the verification data creating unit 11 accesses the database 12 according to the information providing apparatus program and obtains request data or, in other words, data actually to be used for the arithmetic operation by the arithmetic processing apparatus 20. The verification data creating unit 11 then transmits the data as provision information to a program verifying unit 23 of the arithmetic processing apparatus 20.

As will be described later, the arithmetic processing apparatus 20 includes one or more virtual arithmetic processing apparatuses 50. Each of the virtual arithmetic processing apparatuses 50 has an arithmetic processing program executing unit 21, the data requesting unit 22, and the program verifying unit 23. The arithmetic processing program executing unit 21, the data requesting unit 22, and the program verifying unit 23 are all managed by the secure hypervisor 24. In this case, the secure hypervisor 24 refers to a program that exclusively manages resources managed by an OS (in this case, a guest OS 51 of the virtual arithmetic processing apparatus 50) in such a way that others are not allowed to browse or otherwise use the resources without any restrictions. In other words, the secure hypervisor 24 signifies a program that manages the OS in a controlled environment. Note that the intention of exclusivity is, for example, to perform management so as to prevent leakage and falsification by others (the same description will apply hereinafter). In the present embodiment, a case where the secure hypervisor 24 is adopted will be described as an example of the secure program 54 to be described later. In this case, the secure program 54 refers to a program that is executed in a secure virtual environment. For example, based on an arithmetic processing apparatus program provided by the secure program managing unit 31, resources managed by the OS can be exclusively managed. For example, in the case of a virtual arithmetic processing system such as that shown in FIG. 4 to be described later, by installing the secure hypervisor 24 in each of the virtual arithmetic processing apparatuses 50, a controlled environment can be maintained by the management server 30 and secure virtual arithmetic processing apparatuses 50 can be provided even in a system where a hypervisor 60 that manages hardware 61 of the arithmetic processing apparatus 20 is unreliable.

The arithmetic processing program executing unit 21 causes the data requesting unit 22 to make a request to the information providing apparatus 10 for data being requested by the arithmetic processing program and, in response to the request, the information providing apparatus 10 transmits provision information including the request data to the program verifying unit 23. The program verifying unit 23 verifies the arithmetic processing program and, when the arithmetic processing program is proper, the arithmetic processing program executing unit 21 is provided with the request data.

Both the data requesting unit 22 and the program verifying unit 23 are managed by the secure hypervisor 24 according to the arithmetic processing apparatus program. Various kinds of arithmetic processing including arithmetic processing of data request information by the data requesting unit 22 and program verification and provision processing of request data to the arithmetic processing program by the program verifying unit 23 are executed by the virtual arithmetic processing apparatus 50 in a secure OS environment. In a similar manner, processing in the arithmetic processing program executing unit 21 is also executed by the virtual arithmetic processing apparatus 50 in a secure OS (guest OS 51) environment.

The information providing apparatus 10 and the virtual arithmetic processing apparatus 50 are connected to the management server 30, and programs of the verification data creating unit 11 of the information providing apparatus 10 and the secure hypervisor 24 of the virtual arithmetic processing apparatus 50 are provided by the secure program managing unit 31 of the management server 30. The programs are managed by the secure program managing unit 31. As a result, in the arithmetic processing system, information is provided and used in the controlled environment on an information providing platform. Algorithms of data encryption, data decryption and electronic signatures during communication between the information providing apparatus 10 and the arithmetic processing apparatus 20 are also managed by the secure program managing unit 31.

Procedures for providing the virtual arithmetic processing apparatus 50 with request data from the information providing apparatus 10 will be described.

(1) In response to a request from the arithmetic processing program executing unit 21, the data requesting unit 22 creates data request information for making a request to each information providing apparatus 10 for request data that is required by the arithmetic processing program.

(2) The data request information is transmitted from the data requesting unit 22 to the verification data creating unit 11 of the information providing apparatus 10.

(3) The verification data creating unit 11 creates verification data for verifying an object arithmetic processing program.

(4) The verification data creating unit 11 transmits provision information including additional information defining a range of arithmetic processing and conditions of usage restrictions which are allowed for the request data and the arithmetic processing program stored in the database 12 to the program verifying unit 23 of the arithmetic processing apparatus 20.

(5) When the object arithmetic processing program is authenticated in the program verifying unit 23, the arithmetic processing program executing unit 21 is provided with the request data and arithmetic processing by the arithmetic processing program is executed.

The creation of the data request information in (1) above will now be described in detail. The arithmetic processing program being a processing object to be executed by the arithmetic processing program executing unit 21 is a Rust program such as an arithmetic processing program P1 described below. The arithmetic processing program P1 is an example of linear regression analysis and performs linear regression using a least squares method (OLS) on request data (data group).

Arithmetic Processing Program P1

```
// Function executing OLS
    fn ols(array : Array2<f64>) -> Result<Array1<f64>, Box<dyn Error>> ]
        let y = array.slice(s![.., 0]);
        let x = stack![Axis(1), Array2::<f64>::ones((array.nrows( ), 1)), array.slice(s![.., 1..])];
        let inv_xx = x.t( ).dot(&x).inv( ).unwrap( );
        let xy = x.t( ).dot(&y);
        let b = inv_xx.dot(&xy);
        Ok(b)
    }
```

The data request information includes, in addition to information on request data for performing linear regression using the least squares method that is an instruction regarding the request data, information of the arithmetic processing program P1 as a processing object arithmetic program that is, for example, information of a source program. The information of the arithmetic processing program is not limited to a source program and may be any kind of information as long as the information enables a relationship of an output with respect to an input to be specified which is information that enables processing content of the arithmetic processing program to be comprehended such as directly connecting to dedicated hardware of which processing contents have been verified and confirmed in advance or connecting to such hardware in series.

In (2) above, the data request information is transmitted from the data requesting unit 22 to the verification data creating unit 11 of the information providing apparatus 10. The data request information is desirably encrypted according to a protocol that is managed by the secure program managing unit 31.

The creation of the verification data in the verification data creating unit 11 in (3) above will now be described in detail. When the data request information is encrypted, the verification data creating unit 11 decrypts the data request information according to the protocol managed by the secure program managing unit 31. Next, the verification data creating unit 11 creates information for defining a range of arithmetic processing to be allowed for the arithmetic processing program being a processing object in the arithmetic processing apparatus 20.

The verification data creating unit 11 analyzes processing contents of the arithmetic processing program attached to the data request information, creates information necessary for verifying whether or not the arithmetic processing program is proper, and adds the information to the provision information. Therefore, the provision information transmitted from the verification data creating unit 11 to the program verifying unit 23 includes the following information.

(a) Authority information such as an authorization list that defines a range of arithmetic processing and conditions for usage restrictions allowed for the arithmetic processing program in the arithmetic processing apparatus 20.

(b) Data for verification (c) Arithmetic result data for verification used for verification of arithmetic processing (d) Request data (data used for an actual arithmetic operation)

In (4) above, the verification data creating unit 11 transmits provision information including additional information defining a range of arithmetic processing allowed for the request data and the arithmetic processing program to the program verifying unit 23 of the arithmetic processing apparatus 20. Among the provision information, at least (b), (c), and (d) above are desirably encrypted according to the protocol managed by the secure program managing unit 31. Encryption of (a) above may also be performed. Furthermore, by adding an electronic signature to the provision information, falsification can be prevented more reliably.

The processing of the program verifying unit 23 in (5) above will be described in detail. In the program verifying unit 23, (b) and (c) above included in the provision information are used to verify whether or not a result of executing the processing program being the data processing object using the data for verification in (b) above matches the arithmetic result data for verification used for the verification of arithmetic processing in (c) above.

Furthermore, a determination is made as to whether or not the processing program being the data processing object is performing processing so as to exceed the range allowed in the authority information in (a) above when being executed using the data for verification in (b) above.

For example, regarding data saving, when an authorization list as authority information permits an arithmetic result to be saved but does not permit request data itself to be saved, the arithmetic processing apparatus 20 is permitted to save the arithmetic result but is not permitted to separately save the request data itself. Therefore, when the processing program being a data processing object is executed using the data for verification in (b) above, whether not data saving is within the range of the authorization list is verified.

The secure hypervisor 24 of the virtual arithmetic processing apparatus 50 is constantly operated in a controlled environment by a program provided by the secure program managing unit 31. Therefore, arithmetic processing of an arithmetic processing program executed in the program verifying unit 23 and the arithmetic processing program executing unit 21 of the virtual arithmetic processing apparatus 50 can be constantly monitored by the secure hypervisor 24 and processing contents such as data saving, data transfer, and data deletion are constantly comprehended. For this reason, in the arithmetic processing system according to the present example, whether or not data saving is within the range of the authorization list can be appropriately verified when executing the processing program being a data processing object using the data for verification in (b) above.

When a result of executing the arithmetic processing program being a processing object using the data for verification in (b) above in the program verifying unit 23 matches arithmetic result data for verification used for the verification of arithmetic processing in (c) above and when it is determined that the processing program being a data processing object is not performing processing so as to exceed the allowed range in the authority information in (a) above when the processing program is executed using the data for verification in (b) above, the arithmetic processing program being a processing object is determined to be proper or, in other words, the arithmetic processing program is authenticated as a proper arithmetic processing program.

When the arithmetic processing program is authenticated as a proper program, the arithmetic processing program is provided with the request data in (d) above and the arithmetic processing program performs an actual arithmetic operation using the request data in the arithmetic processing program executing unit 21.

Figure 3:
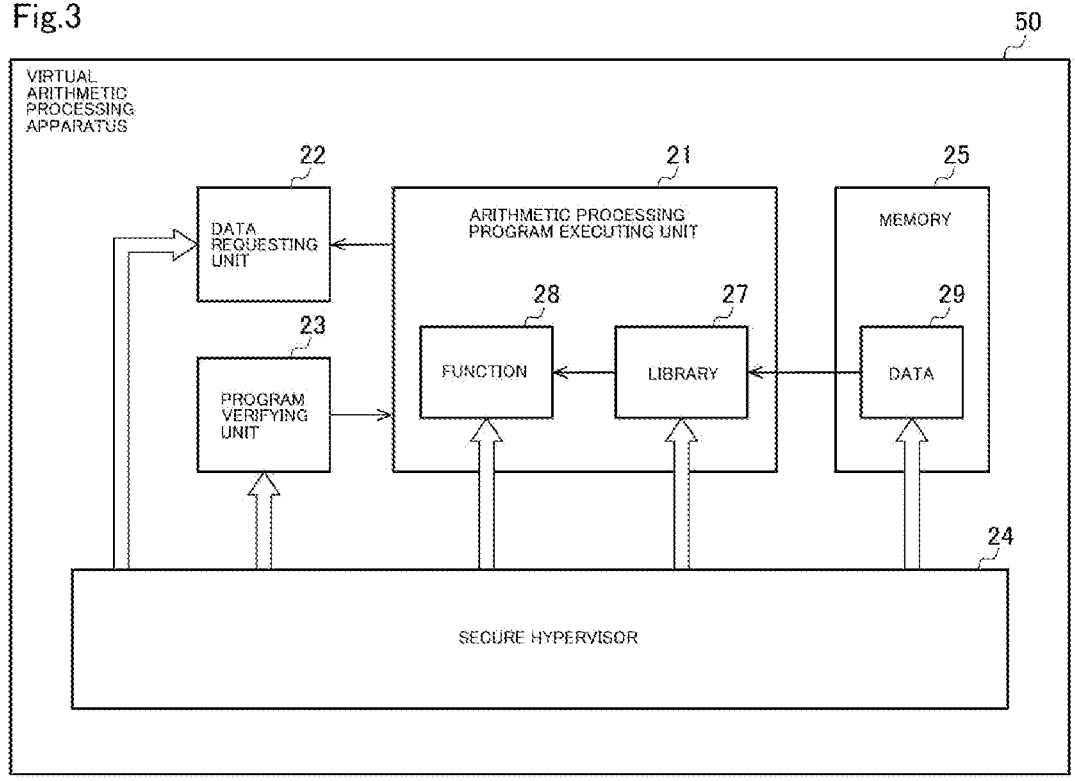
FIG. 3 is an explanatory operation diagram of a virtual arithmetic processing apparatus.

FIG. 3 is an explanatory operation diagram of the virtual arithmetic processing apparatus 50. The data requesting unit 22, the program verifying unit 23, the arithmetic processing program executing unit 21, a memory 25, and other input/output apparatuses (not illustrated) are all processed in an environment managed by the secure hypervisor 24. As a result, a state can be realized in which all operations of the guest OS 51 can be managed by the secure hypervisor 24 or, in other words, a secure execution environment of the guest OS 51 can be realized. Note that the explanatory operation diagram of the virtual arithmetic processing apparatus 50 in FIG. 3 is an example of the present embodiment and the OS can also be secured by various other configurations.

In the arithmetic processing program executing unit 21, a function 28 transmits and receives all data 29 via a library 27. A library-dedicated area that can be accessed only by the library 27 is virtually provided in the memory 25 and, for example, request data obtained via the program verifying unit 23 are stored in the library-dedicated area in the memory 25. In addition, for example, the data 29 is stored in the library-dedicated area in the memory 25 in FIG. 3. The function 28 can access the request data stored in the library-dedicated area in the memory 25. Furthermore, the function 28 receives the data 29 in the memory 25 via the library 27. Using the received data 29, the function 28 performs an arithmetic operation according to the function 28 by the CPU of the arithmetic processing apparatus 20. After the arithmetic operation of the function 28 is completed, a user is only provided with a final arithmetic result list by the arithmetic processing program and the data 29 used during the arithmetic operation which is present in the area of the data 29 in the memory 25 is completely deleted. A method for completely deleting the data 29 is not particularly limited and an appropriate method such as filling all the pieces of data with "0" can be adopted. In addition, the function 28 provides the user with only a list of arithmetic results.

As described above, since the function 28 transmits and receives all data 29 via the library 27 under complete management by the secure hypervisor 24, request data and data 29 used during an arithmetic operation do not remain in areas other than the library-dedicated area in the memory 25 in the arithmetic processing apparatus 20 and the request data is stored only in the library 27 in a state where the request data can be managed by the secure hypervisor 24. Therefore, the secure hypervisor 24 can use the request data within the range of authority defined in the authorization list received from the information providing apparatus 10 and can reliably manage the request data in the library 27. In addition, as described above, the data 29 in the library-dedicated area in the memory 25 can be completely deleted.

While an example of securing an OS (the guest OS 51) has been described, operations of the arithmetic processing apparatus 20 can also be managed by the secure hypervisor 24 by virtualizing an application used in an arithmetic operation performed by the arithmetic processing program executing unit 21. In such a case, after an arithmetic operation by the application is started and before request data are called by the application, the application is operated in a virtual environment (hereinafter referred to as a "secure environment") in which the secure hypervisor 24 manages all operations. Next, when an arithmetic result is output from the application, the secure hypervisor 24 provides the user with only a list of arithmetic results and, after deleting request data and data 29 used during the arithmetic operation, the application is returned from the secure environment to an operation in a normal arithmetic environment of the arithmetic processing apparatus 20. Therefore, even in a case of virtualization of an application, since the secure hypervisor 24 manages the application in the secure environment, the secure hypervisor 24 monitors that the arithmetic operation is within the range of the authority defined in the authorization list received from the information providing apparatus 10. In other words, outputting data to a console is restricted and writing data to a file, performing network communication, and the like are prohibited in accordance with provisions of the authorization list. Furthermore, for example, using an authenticated GPU enables only the arithmetic result to be presented to the user under the control of the secure hypervisor 24.

While an example of authenticating one program at a time has been described, the present example is not limited thereto and, for example, a plurality of programs can be authenticated in advance and a plurality of the authenticated programs may be combined to perform an arithmetic operation.

Figure 4:
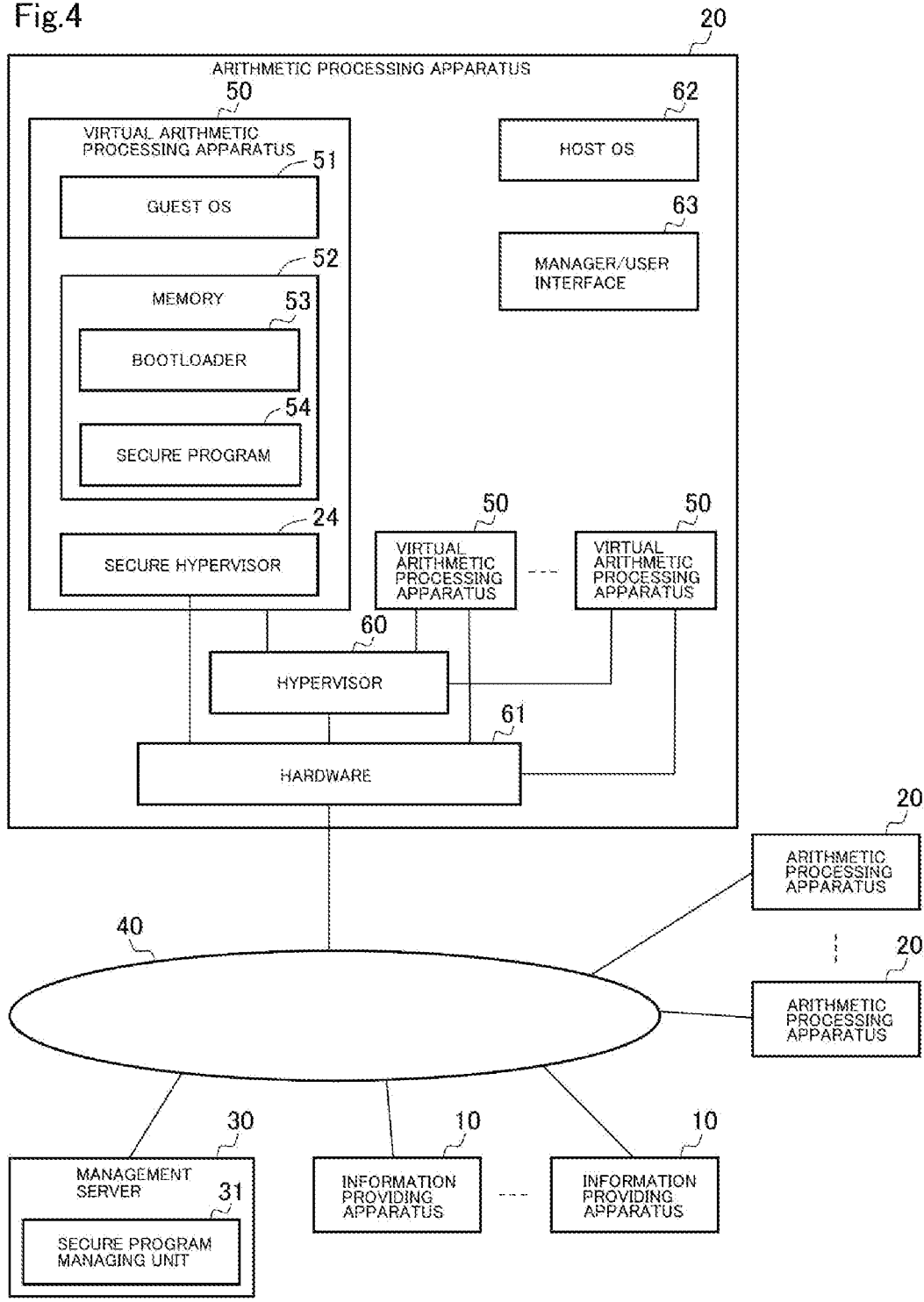
FIG. 4 is a block diagram of an arithmetic processing apparatus.

FIG. 4 is a block diagram of the arithmetic processing apparatus 20. The arithmetic processing apparatus 20 includes one or more virtual arithmetic processing apparatuses 50, the hypervisor 60, and hardware 61. The hypervisor 60 manages the hardware 61 of the arithmetic processing apparatus 20 and provides the virtual arithmetic processing apparatuses 50 with an arithmetic processing environment as a virtual physical environment. The hardware 61 is hardware resources of the arithmetic processing apparatus 20 including at least a CPU, an input/output apparatus and a storage apparatus. In addition, the arithmetic processing apparatus 20 includes a host OS 62 and a manager/user interface 63. While the arithmetic processing apparatus 20 also includes a user interface for the virtual arithmetic processing apparatuses 50 and the like, the user interface and the like are not illustrated.

Each virtual arithmetic processing apparatus 50 includes a guest OS 51, a memory 52, and the secure hypervisor 24. In addition, the memory 52 stores a bootloader 53 and the secure program 54. The bootloader 53 is for acquiring the secure program 54 and the bootloader 53 is transferred from the secure program managing unit 31 to the memory 52 using functions of the hardware 61 without being monitored by the hypervisor 60 or, in other words, without having contents of information being read by the hypervisor 60 (the same description applies hereinafter). The bootloader 53 can have same contents with respect to each guest OS 51. In this case, the secure program 54 refers to a program that is executed in a secure virtual environment. Although not particularly limited, in the present embodiment, a case where the secure hypervisor 24 is adopted as the secure program 54 will be exemplified and described. In addition, since the memory 52 is encrypted using functions of the hardware 61, the hypervisor 60, the host OS 62, the manager/user interface 63, and the other virtual arithmetic processing apparatuses 50 are unable to read or write contents of the memory 52.

The guest OS 51 is encrypted by a first public key, acquired from the secure program managing unit 31 by the bootloader 53, and decrypted using a first private key and started. Note that the first private key is a private key that is built into the bootloader 53 in order to acquire a guest OS. The secure program 54 is encrypted by a second public key, acquired from the secure program managing unit 31 by the guest OS 51, and decrypted using a second private key. Note that the second private key is a private key that is included in the guest OS 51 in order to acquire the secure program 54. In addition, the secure hypervisor 24 is validated by starting the secure program 54.

Under the management of the secure hypervisor 24, the guest OS 51 acquires information from the information providing apparatus 10 being managed by the management server 30. In the virtual arithmetic processing apparatuses 50, arithmetic processing is executed within a range of information usage conditions approved in advance or, in other words, within a range of additional information defining a range of arithmetic processing and conditions for usage restrictions allowed for the request data and the arithmetic processing program.

Hardware 61 of the arithmetic processing apparatus 20 including a CPU is reliable. In this case, being reliable means reliable in terms of, for example, not causing falsification or leakage (the same description applies hereinafter). However, since the hypervisor 60 of the arithmetic processing apparatus 20 is not necessarily reliable, in the present embodiment, means for installing the secure hypervisor 24 in each virtual arithmetic processing apparatus 50 in a safe and secure manner can be provided even in an environment where the hypervisor 60 is unreliable.

Next, a procedure until the secure hypervisor 24 is validated in the virtual arithmetic processing apparatus 50 will be described with reference to FIG. 5. FIG. 5 is a flow chart of downloading the secure program 54. While the secure hypervisor 24 of the virtual arithmetic processing apparatus 50 is acquired from the secure program managing unit 31 and validated, in an environment in which the hypervisor 60 is unreliable, the secure hypervisor 24 must be installed in the virtual arithmetic processing apparatus 50 corresponding to each guest OS 51 using cryptographic communication that cannot be read by the hypervisor 60.

(Procedure 1) Procedure with Management Server 30 (S1)

In a secure environment managed by the secure program managing unit 31 of the management server 30, arithmetic processing using the provision information having been provided from the information providing apparatus 10 is executed in the arithmetic processing apparatus 20 while managing the provision information so as to prevent the provision information from being exploited and an arithmetic result thereof is made ready to be utilized. To this end, in order to install the bootloader 53 and the secure hypervisor 24 in each virtual arithmetic processing apparatus 50, a manager of the arithmetic processing apparatus 20 registers information on the hardware 61 in the secure program managing unit 31 with respect to the management server 30 by inputting the information from the manager/user interface 63 (S1). When making communication during a registration request from the manager/user interface 63 cryptographic communication, the secure program managing unit 31 can determine whether or not the hardware 61 is authentic. For example, in a case of a CPU having a function of being able to encrypt the memory 52 for each virtual arithmetic processing apparatus 50 or, more specifically, in a case of SEV by Advanced Micro Devices, Inc. (AMD), a public key of the hardware 61 (CPU) is registered. Information for registering the hardware 61 is transmitted from the manager/user interface 63 to the secure program managing unit 31 via the hypervisor 60 and the hardware 61.

(Procedure 2) Transfer of Bootloader 53 (S2 to S3)

In S2, the manager of the arithmetic processing apparatus 20 makes a transfer request for the bootloader 53 from the manager/user interface 63 to the secure program managing unit 31 via the hypervisor 60 and the hardware 61. Specifically, the hypervisor 60 uses a public key of the hardware 61 to make a transfer request for the bootloader 53 to the secure program managing unit 31 via the hardware 61.

In S3, the secure program managing unit 31 transfers the bootloader 53 to the memory 52 via the hardware 61 and the hypervisor 60. At this point, the transfer processing of the bootloader 53 is performed so that contents of the transfer request for the bootloader 53 cannot be read from the hypervisor 60. In doing so, since the transfer information of the bootloader 53 is being encrypted in a form which enables the transfer information to be only utilized from the virtual arithmetic processing apparatus 50 and, for example, to be only read by the executing hardware 61, contents of the program including the first private key cannot be read by the hypervisor 60. Therefore, the bootloader 53 can be transferred from the secure program managing unit 31 to the memory 52 using functions of the hardware 61 without being monitored by the hypervisor 60. In addition, while transferring the bootloader 53 to the memory 52 has been described, the present embodiment is not limited thereto and the bootloader 53 may be saved in, for example, a hard disk or the like. When saving the bootloader 53 in a hard disk or the like, the bootloader 53 need no longer be repetitively transferred every time the virtual arithmetic processing apparatus 50 is started.

(Procedure 3) Encryption of Memory 52 (S4 to S5)

In S4, a start request for the virtual arithmetic processing apparatus 50 is made from the manager/user interface 63 to the hardware 61 via the hypervisor 60.

In S5, the hardware 61 performs encryption of the memory 52 according to a command from the hypervisor 60. The hypervisor 60 instructs the hardware 61 to encrypt the memory 52 for each virtual arithmetic processing apparatus 50. As a result, the hardware 61 encrypts the memory 52 for each virtual arithmetic processing apparatus 50. For example, with SEV by AMD, the memory 52 is encrypted by automatically using a different encryption key for each virtual arithmetic processing apparatus 50. At this point, the hypervisor 60 is unable to read the encryption key used in the encryption with respect to the command for encrypting the memory 52. While a flow from S2 to S5 has been described, the present embodiment is not limited to this flow and, for example, the transfer request for the bootloader 53 in S2 and the transfer of the bootloader 53 in S3 can be performed after the encryption of the memory 52 in S5. When the bootloader 53 is already stored in the hard disk or the like, the bootloader 53 need not be read every time the virtual arithmetic processing apparatus 50 is started.

(Procedure 4) Deployment of Bootloader 53 to Each Memory 52 (S6)

When a start request for the virtual arithmetic processing apparatus 50 is made from the manager/user interface 63 to the hardware 61 via the hypervisor 60 in S4, in S6 after S5, the hardware 61 deploys the bootloader 53 for each memory 52. At this point, the hypervisor 60 cannot read the program of the bootloader 53 that includes the first private key to be deployed for each memory 52.

In S3, the bootloader 53 is transferred to the memory 52 using functions of the hardware 61 and, in S6, the bootloader 53 is deployed on each memory 52 using functions of the hardware 61. In doing so, since the information that is transferred by the start request for the virtual arithmetic processing apparatus 50 has been encrypted in a form which enables the information to be only utilized from the virtual arithmetic processing apparatus 50 and, for example, to be only be read by the executing hardware 61, contents of the program including the first private key cannot be read by the hypervisor 60. Therefore, the bootloader 53 can be transferred from the secure program managing unit 31 to the memory 52 and deployed on each memory 52 using functions of the hardware 61 without being monitored by the hypervisor 60. For example, a Migration function which is included in the CPU among the hardware 61 and which saves an execution state of a given virtual arithmetic processing apparatus 50 and enables execution under another virtual arithmetic processing apparatus 50 can be used to transfer the bootloader 53 to each memory 52 and deploy the bootloader 53 on each memory 52. Using the Migration function enables, even in a case of a virtual arithmetic processing apparatus 50 of which the memory 52 is encrypted, contents of the memory 52 to be deployed on the memory 52 of another virtual arithmetic processing apparatus 50.

For example, when the CPU is SEV by AMD, the Migration function is supported and the manager of the arithmetic processing apparatus 20 can transfer the bootloader 53 to the memory 52 and deploy the bootloader 53 on each memory 52 for each virtual arithmetic processing apparatus 50 as functions of the SEV without being monitored by the hypervisor 60. In the Migration function of SEV, the bootloader 53 is encrypted for each piece of hardware 61 upon transfer, an encrypted memory image of the bootloader 53 can be created for each virtual arithmetic processing apparatus 50, and with respect to all of the virtual arithmetic processing apparatuses 50 in the arithmetic processing apparatus 20, same contents of the memory 52 can be deployed encrypted for each virtual arithmetic processing apparatus 50.

In addition, in S6, for each virtual arithmetic processing apparatus 50, the hardware 61 starts the bootloader 53 having been deployed on the memory 52.

(Procedure 4) Start of Guest OS 51 (S7 to S8)

In S7, the bootloader 53 transmits a guest OS 51 start request to the secure program managing unit 31. The guest OS 51 start request is transmitted from the bootloader 53 to the secure program managing unit 31 via the hardware 61. In S8, upon receiving the guest OS 51 start request, the secure program managing unit 31 transfers the guest OS 51 to the memory 52. The guest OS 51 is transmitted from the secure program managing unit 31 to the memory 52 via the hardware 61. At this point, the bootloader 53 uses the first private key to start the guest OS 51 for each virtual arithmetic processing apparatus 50. In other words, since the cryptographic communication when the secure program managing unit 31 transfers the guest OS 51 to the memory 52 has been encrypted by the first public key and cannot be decrypted without the first private key, the cryptographic communication cannot be monitored by a hypervisor. For example, TLS 1.3 can be used for the cryptographic communication.

(Procedure 5) Acquisition of Secure Program 54 (S9 to S10)

The guest OS 51 acquires the secure program 54 from the secure program managing unit 31 by cryptographic communication using the second private key and stores the secure program 54 in the memory 52. In S9, the guest OS 51 transmits an acquisition request for the secure program 54 to the secure program managing unit 31 via the hardware 61. Upon receiving the acquisition request for the secure program 54, in S10, the secure program managing unit 31 transmits the secure program 54 to the memory 52 via the hardware 61. Since the cryptographic communication when transferring the secure program 54 has been encrypted by the second public key and the secure program 54 is stored in the encrypted memory 52, the virtual arithmetic processing apparatus 50 can acquire the secure program 54 without being monitored by the hypervisor 60. For example, TLS 1.3 can be used for the cryptographic communication.

(Procedure 6) Start of Secure Hypervisor 24 (S11 to S12)

In S11, the guest OS 51 starts the secure program 54 acquired in Procedure 5 and saved in the memory 52. In S12, the secure hypervisor 24 is executed and, accordingly, the secure hypervisor 24 is validated in the virtual arithmetic processing apparatus 50. FIG. 4 is a block diagram of a case where the secure hypervisor 24 has been validated. The guest OS 51 acquires provision information from the information providing apparatus 10 being managed by the management server 30 by cryptographic communication using a private key under the management of the secure hypervisor 24 and performs arithmetic processing within a range of usage conditions defined by additional information. Although omitted in FIG. 4, the virtual arithmetic processing apparatus 50 is provided with the arithmetic processing program executing unit 21, the data requesting unit 22, and the program verifying unit 23 as described earlier with reference to FIG. 2 and acquisition of provision information and arithmetic processing are performed in a state of being managed by the secure hypervisor 24.

According to the procedures described above, the secure hypervisor 24 is installed in the virtual arithmetic processing apparatus 50. Using the Migration function and the encryption function included in the CPU among the hardware 61 enables a secure environment by the secure hypervisor 24 to be constructed in each virtual arithmetic processing apparatus 50 even with the arithmetic processing apparatus 20 including an unreliable hypervisor 60. Since public-key cryptography is used for encryption, the hassle of password management and the like can be resolved. Public keys and private keys can be freely set in the secure program managing unit 31.

For example, TLS 1.3 communication can be used for the cryptographic communication. TLS 1.3 communication is communication that enables two-way authentication. When the management server 30 possesses a private key, the management server 30 itself is guaranteed to be an authentic management server while a public key is made available to the public. On the other hand, when the guest OS 51 possesses a private key, the guest OS 51 itself is guaranteed to be an authentic OS. Therefore, compared to a case where public-key cryptography is not used, password management including distribution of a one-time password can be omitted.

In addition, in the present embodiment, since the second private key is held inside a wall of encryption by the first private key, the virtual arithmetic processing apparatus 50 with high reliability can be provided. Specifically, when the bootloader 53 starts the guest OS 51, the guest OS 51 transferred from the secure program managing unit 31 to the memory 52 is encrypted by the first public key while including the second private key and cannot be decrypted without the first private key. Furthermore, when the guest OS 51 downloads the secure program 54, communication encrypted by the second public key is used and the secure program 54 cannot be decrypted without the second private key. The first private key is distributed to the virtual arithmetic processing apparatus 50 at a time point where the bootloader 53 is transferred and the first private key is protected inside the encrypted memory 52.

While a description of the secure program managing unit 31 transferring the bootloader 53 to the memory 52 has been given in S2 and S3 in Procedure 2 described above, the present embodiment is not limited to this procedure and, for example, at least one of the guest OS 51, the secure program 54, and the secure hypervisor 24 may be transferred together with transferring the bootloader 53. In addition, since such transfers of programs are similarly not monitored by the hypervisor 60, even in an environment where the hypervisor 60 is unreliable, respective programs (the bootloader 53, the guest OS 51, the secure program 54, the secure hypervisor 24, and the like) can be safely transferred to the memory 52 of each virtual arithmetic processing apparatus 50. Furthermore, when simultaneously transferring other programs together with the bootloader 53, subsequent procedures are not necessarily limited to the Procedures 3 to 6 described above and any procedures can be adopted as long as the transfers of programs are not monitored by the hypervisor 60.

Second Embodiment

An arithmetic processing apparatus, an arithmetic processing system, an arithmetic processing method, and an arithmetic processing program according to a second embodiment of the present invention will now be described. While an example in which the secure program 54 is the secure hypervisor 24 has been described in the first embodiment, in the present embodiment, an example in which the secure program 54 is other than the secure hypervisor 24 will be described. As in the present embodiment, in a virtual environment, various other programs such as an OS itself, a game, a processing infrastructure of data science, an AI, and a program including an intellectual property-like value of which reverse engineering is desirably prevented can be used as the secure program 54. Examples of the processing infrastructure of data science include data collection, data accumulation, data processing, and data analysis. Examples of the AI include machine learning. In addition, the program including an intellectual property-like value of which reverse engineering is desirably prevented refers to a program in which the program itself or data used by the program includes an invention, a copyright, a trade secret, or information or the like to be protected by the Unfair Competition Prevention Act such as a program in which an algorithm used in the program includes an invention, a program in which a data structure used by the program includes an invention or a copyright, a program in which data used by the program includes a trade secret or information to be protected by the Unfair Competition Prevention Act, and a program including a trained model or learning data of machine learning. When transferring any of the secure programs 54 to the memory 52, the transfer is not monitored by the hypervisor 60 in a similar manner to the first embodiment. Therefore, even in an environment where the hypervisor 60 is unreliable, the secure program 54 can be safely transferred to the memory 52 of each virtual arithmetic processing apparatus 50.

When the secure program 54 is an OS itself, the OS can be started according to procedures similar to those of S1 to S8 in the first embodiment. In addition, when the secure program 54 is a game, a processing infrastructure of data science, an AI, a program including an intellectual property-like value of which reverse engineering is desirably prevented, or the like, the secure program 54 can be transferred to the memory 52 according to procedures similar to those of S1 to S10 in the first embodiment.

In addition, while a description of the bootloader 53 transmitting a guest OS 51 start request to the secure program managing unit 31 and the guest OS 51 initially being transmitted from the secure program managing unit 31 to the memory 52 via the hardware 61 has been given in S7 in Procedure 4 in the first embodiment, the present embodiment is not limited to this procedure and, for example, the bootloader 53 may acquire at least one of the guest OS 51, the secure program 54, and the secure hypervisor 24. Therefore, for example, the bootloader 53 may perform transfer of the secure program 54 or the secure hypervisor 24 concurrently with the transfer of the guest OS 51 or in place of the transfer of the guest OS 51. In other words, while a description of transferring the secure program 54 after starting the guest OS 51 has been given in the first embodiment, starting the guest OS 51 or performing the procedure is not necessarily essential, the bootloader 53 can transfer any secure program 54, and the transfer of the secure program 54 is not monitored by the hypervisor 60 in a similar manner to the first embodiment. Therefore, even in an environment where the hypervisor 60 is unreliable, the secure program 54 can be safely transferred to the memory 52 of each virtual arithmetic processing apparatus 50.

While some embodiments of the present invention have been described above, the embodiments merely exemplify an arithmetic processing apparatus, an arithmetic processing system, an arithmetic processing method, and an arithmetic processing program for embodying technical ideas of the present invention. The present invention is not limited to the embodiments and can be equally applied to other embodiments. Furthermore, parts of the embodiments can be omitted, added, or modified and aspects of the respective embodiments can be combined with each other.

What is claimed is:

1. An arithmetic processing apparatus capable of acquiring a secure program from outside, the secure program being a program including at least one of a secure hypervisor, an operating system (OS), a game, a processing infrastructure of data science, an artificial intelligence (AI), and a program including an intellectual property-like value of which reverse engineering is desirably prevented, the arithmetic processing apparatus comprising at least: hardware including at least a central processing unit (CPU), an input/output apparatus, and a storage apparatus; a hypervisor managing the hardware; and one or more virtual arithmetic processing apparatuses provided with a virtual arithmetic processing environment by the hypervisor, wherein
   each of the virtual arithmetic processing apparatuses includes at least a guest OS and a memory,
   a bootloader is transferred to the memory for each of the virtual arithmetic processing apparatuses from the outside using functions of the hardware, transfer information of the bootloader being encrypted such that the transfer information is to be only read by the hardware which transfers the bootloader to the memory and in such a manner that the bootloader can only be used by the hardware from the virtual arithmetic processing apparatus,
   the bootloader starts the secure program in the virtual arithmetic processing apparatus,
   the bootloader acquires at least any one of the guest OS, and the secure program,
   the guest OS is acquired and started by the bootloader, and the guest OS acquires the secure program.

2. The arithmetic processing apparatus according to claim 1, wherein the guest OS acquires the secure hypervisor as the secure program.

3. The arithmetic processing apparatus according to claim 1, wherein at least any one of the guest OS, and the secure program is transferred along with the transfer of the bootloader.

4. The arithmetic processing apparatus according to claim 3, wherein the secure hypervisor is transferred as the secure program.

5. An arithmetic processing system comprising at least the arithmetic processing apparatus according to claim 1 and a management server managing the arithmetic processing apparatus, wherein
the management server includes at least a secure program managing unit managing the secure program to be provided to the virtual arithmetic processing apparatuses.

6. An arithmetic processing program executing each step of the arithmetic processing method according to claim 5 by a computer.

7. An arithmetic processing apparatus capable of acquiring a secure program from outside, the secure program being a program including at least one of a secure hypervisor, an operating system (OS), a game, a processing infrastructure of data science, an artificial intelligence (AI), and a program including an intellectual property-like value of which reverse engineering is desirably prevented, the arithmetic processing apparatus comprising at least: hardware including at least a central processing unit (CPU), an input/output apparatus, and a storage apparatus; a hypervisor managing the hardware; and one or more virtual arithmetic processing apparatuses provided with a virtual arithmetic processing environment by the hypervisor, wherein
each of the virtual arithmetic processing apparatuses includes at least a guest OS and a memory,
a bootloader is transferred to the memory for each of the virtual arithmetic processing apparatuses from the outside in such a manner that the bootloader can only be used by the hardware from the virtual arithmetic processing apparatus,
the bootloader starts the secure program in the virtual arithmetic processing apparatus,
the bootloader acquires at least any one of the guest OS, and the secure program,
the guest OS is acquired and started by the bootloader, the guest OS acquires the secure program,
the guest OS acquires the secure hypervisor as the secure program
the virtual arithmetic processing apparatuses are managed by the secure hypervisor, and
the secure hypervisor manages the virtual arithmetic processing apparatuses so that arithmetic processing is performed within a range of usage conditions defined by additional information attached to provision information acquired from an external information providing apparatus.

8. An arithmetic processing apparatus capable of acquiring a secure program from outside, the secure program being a program including at least one of a secure hypervisor, an operating system (OS), a game, a processing infrastructure of data science, an artificial intelligence (AI), and a program including an intellectual property-like value of which reverse engineering is desirably prevented, the arithmetic processing apparatus comprising at least: hardware including at least a central processing unit (CPU), an input/output apparatus, and a storage apparatus; a hypervisor managing the hardware; and one or more virtual arithmetic processing apparatuses provided with a virtual arithmetic processing environment by the hypervisor, wherein
each of the virtual arithmetic processing apparatuses includes at least a guest OS and a memory,
a bootloader is transferred to the memory for each of the virtual arithmetic processing apparatuses from the outside in such a manner that the bootloader can only be used by the hardware from the virtual arithmetic processing apparatus,
the bootloader starts the secure program in the virtual arithmetic processing apparatus,
the bootloader acquires at least any one of the guest OS, and the secure program,
the guest OS is acquired and started by the bootloader, and the guest OS acquires the secure program,
at least any one of the guest OS, and the secure program is transferred along with the transfer of the bootloader,
the secure hypervisor is transferred as the secure program,
the virtual arithmetic processing apparatuses are managed by the secure hypervisor, and
the secure hypervisor manages the virtual arithmetic processing apparatuses so that arithmetic processing is performed within a range of usage conditions defined by additional information attached to provision information acquired from an external information providing apparatus.

9. An arithmetic processing method carried out by an arithmetic processing apparatus capable of acquiring a secure program from outside, the secure program being a program including at least one of a secure hypervisor, an operating system (OS), a game, a processing infrastructure of data science, an artificial intelligence (AI), and a program including an intellectual property-like value of which reverse engineering is desirably prevented,
the arithmetic processing apparatus including at least: hardware including at least a central processing unit (CPU), an input/output apparatus, and a storage apparatus; a hypervisor managing the hardware; and one or more virtual arithmetic processing apparatuses provided with a virtual arithmetic processing environment by the hypervisor, and
each of the virtual arithmetic processing apparatuses including at least a guest OS and a memory,
the arithmetic processing method comprising the steps of:
transferring a bootloader to the memory for each of the virtual arithmetic processing apparatuses from the outside using functions of the hardware, transfer information of the bootloader being encrypted such that the transfer information is to be only read by the hardware which transfers the bootloader to the memory in such a manner that the bootloader can only be used by the hardware from the virtual arithmetic processing apparatus;
starting, with the bootloader, the secure program in the virtual arithmetic processing apparatus;
acquiring, with the bootloader, at least any one of the guest OS, and the secure program;
acquiring and starting, with the bootloader, the guest OS; and
acquiring, with the guest OS, the secure program.

10. An arithmetic processing program executing each step of the arithmetic processing method according to claim 9 by a computer.

* * * * *